United States Patent [19]

Atkins

[11] 3,981,543
[45] Sept. 21, 1976

[54] SKID CONTROL SYSTEM EMBODYING FAIL SAFE BYPASS

[75] Inventor: Thomas M. Atkins, Ann Arbor, Mich.

[73] Assignee: Kelsey-Hayes Company, Romulus, Mich.

[22] Filed: Apr. 7, 1975

[21] Appl. No.: 565,556

Related U.S. Application Data

[62] Division of Ser. No. 391,463, Aug. 24, 1973.

[52] U.S. Cl. .................... 303/21 AF; 188/181 A; 303/10; 303/21 F
[51] Int. Cl.² .......................................... B60T 8/02
[58] Field of Search ............... 303/21 F, 61–63, 303/68–69, 10, 21 AF; 188/181 A, 181 R

[56] References Cited
UNITED STATES PATENTS

| | | | |
|---|---|---|---|
| 3,556,615 | 1/1971 | Stelzer | 303/21 F |
| 3,602,554 | 8/1971 | Ichimura et al. | 303/21 F X |
| 3,610,701 | 10/1971 | Riordan | 303/21 F X |
| 3,672,731 | 6/1972 | Koivunen | 303/21 F |
| 3,810,680 | 5/1974 | Schenk | 303/21 F X |
| 3,813,130 | 5/1974 | Inada | 303/21 F |

Primary Examiner—George E. A. Halvosa
Assistant Examiner—Douglas C. Butler
Attorney, Agent, or Firm—Harness, Dickey & Pierce

[57] ABSTRACT

A hydraulically operated automotive skid control system. The system includes a regulator that regulates pump pressure that operates on the modulator in response to variations in braking system pressure. A combined bypass and isolation valve is incorporated for providing a direct source of actuating fluid in the event of failure of the pump to maintain adequate pressure.

5 Claims, 1 Drawing Figure

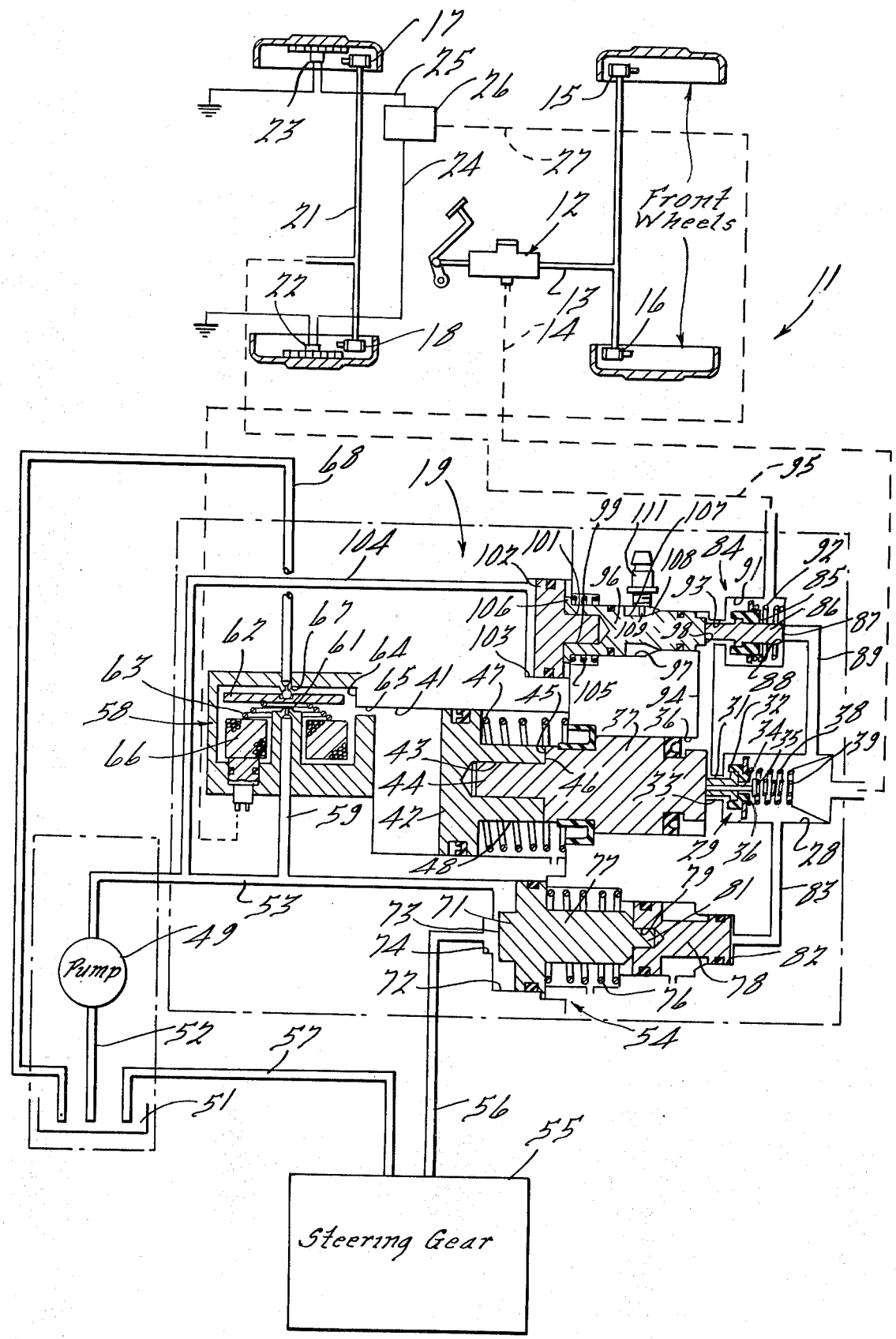

SKID CONTROL SYSTEM EMBODYING FAIL SAFE BYPASS

This is a division, of application Ser. No. 391,463, filed Aug. 24, 1973.

BACKGROUND OF THE INVENTION

This invention relates to vehicular skid control systems and more particularly to an improved fail safe device for such a system.

Automatic skid control systems include what is generally known as a modulator that is interposed in the circuit between the master cylinder and the wheel cylinders. This modulator is effective to reduce the pressure transmitted from the master cylinder to the wheel cylinders in the event of an incipient skid condition. The modulator includes one or more members that are movable between a normal braking position and the skid control position. Some form of power device is incorporated for moving the modulator member between these positions. In certain systems, this power device is effective to hold the movable member in its normal braking position. In the event of failure of the power device, the movable member may move to its skid control position and interfere with normal brake operation. It is, of course, desirable to provide a fail safe device that will insure normal brake operation in the event of such a failure. Devices have been proposed for this purpose. In at least certain of these prior art devices it was necessary for the operator to apply master cylinder pressure to operate the fail safe device. Such an arrangement can result in the loss of at least some brake actuating fluid, causing excess brake pedal travel. Furthermore, the systems are not automatically preconditioned for fail safe operation in the event of failure.

It is, therefore, a principal object of this invention to provide an improved fail safe device for a vehicular skid control system.

It is a further object of the invention to provide a fail safe device for a skid control system that permits normal brake operation under the failure mode.

It is another object of the invention to provide a skid control system fail safe device that permits the transmission of actuating fluid from the master cylinder to the wheel brakes independently of the expansion chamber of the skid control system.

It is a still further object of this invention to provide a fail safe device for a skid control system that is automatically operative to provide fail safe operation in the event of failure of the skid control system without necessitating operation of the vehicle brakes to establish this condition.

In addition to providing a separate actuating circuit between the master cylinder and the wheel cylinders under the failure mode, it is desirable to isolate the master cylinder from the modulator in the event of failure. Doing so insures against the loss of actuator fluid into the modulator under failure conditions. The previously proposed systems that accomplish this result employ complicated multiple valve arrangements.

It is, therefore, a further object of this invention to provide an improved bypass valve for a skid control system.

As has been noted, some form of power device is normally provided in a skid control system for operating the modulator between its skid control and normal braking positions. The advantages of using am amcillary fluid pressure source, such as the power steering pump, for this purpose have recently been emphasized. In one type of system embodying the use of such ancillary fluids, the ancillary fluid holds the modulator in its normal braking position. It is, as has been noted, important to insure normal brake operation in the event of failure of the ancillary fluid source to provide sufficient pressure to hold the modulator in its normal braking position. This fail safe device should be operative immediately upon such failure.

It is, therefore, another object of this invention to provide a fail safe device for a fluid pressure operated skid control system that is operative immediately upon the failure of the fluid pressure operator.

SUMMARY OF THE INVENTION

A first feature of this invention is adapted to be embodied in a skid control system for a vehicle having at least one wheel brake and a brake actuator circuit for delivering actuating fluid to the one wheel brake under selective operator actuation. A skid control means including a member movable from a normal braking position to a skid control position in response to a predetermined signal is provided to reduce the pressure in the one wheel brake to prevent a skid condition. Power means normally hold the movable member in its normal braking position. Fail safe means are provided that are responsive to the operation of the power means for providing a source of actuating fluid to the one wheel brake in the event of failure of the power means for conditioning the system for fail safe brake operation prior to operation of the brake actuating circuit.

Another feature of the invention is also adapted to be embodied in a skid control system for a vehicle. The skid control system includes a master cylinder for providing actuating fluid, a wheel cylinder for operating the one wheel brake and a brake actuating circuit interconnecting the master cylinder and the one wheel cylinder. A modulator is provided in the brake actuating circuit for reducing the pressure transmitted from the master cylinder to the wheel cylinder in the response to a predetermined signal for preventing a skid condition. A bypass circuit is also provided between the master cylinder and the one wheel cylinder. A single valve element is provided for controlling the flow through the bypass circuit and for isolating the modulator from the wheel cylinder in response to movement of the single valve element from a normal position to a failure position. The single valve element is movable between its normal position and its failure position in response to a failure of the skid control system.

A further feature of the invention is adapted to be embodied in a skid control system for a vehicle having a brake actuating device for delivering actuating fluid to one wheel brake under selective operator actuation. The skid control system includes a modulator having a differential area device that includes a first area exposed to pressure in the brake actuating circuit and a second area. The differential area device of the modulator is held in a normal braking position by a source of ancillary fluid that operates on its second area. A bypass valve is provided for controlling the flow of fluid through a bypass circuit from the brake actuating circuit to the one wheel brake. The bypass valve has a differential area including a first area exposed to the pressure in the brake actuating circuit and a second area exposed to the pressure of the ancillary fluid. The pressure of the ancillary fluid acting on the bypass valve urges the bypass valve to its closed position. The ratio between the second and first areas of the modulator is greater than the ratio of the second and first areas of the bypass valve so that the bypass valve will operate before the modulator operates in the event of failure of the ancillary fluid to maintain sufficient pressure to hold the modulator in its normal braking position.

BRIEF DESCRIPTION OF THE DRAWINGS

The FIGURE of the drawings illustrates, in part schematically, a skid control system embodying this invention.

DETAILED DESCRIPTION OF THE PREFERRED EMBODIMENT

A vehicle braking system including a skid control system incorporating this invention is identified generally by the reference numeral 11. The braking system includes a master cylinder, of the dual type, 12 having independent output circuits 13 and 14. The circuit 13 serves the brake cylinders 15 and 16 of the front wheel brakes, which may be of the disk or drum type. The circuit 14 serves the wheel cylinders 17 and 18 of the rear wheel brakes via a skid control modulator, indicated generally by the reference numeral 19, and conduit 21. The rear wheel brakes also may be of either the drum or disk type. In the illustrated embodiment, the skid control modulator 19 acts only on the brake circuit serving the rear wheels and controls both of the wheel cylinders 17 and 18 simultaneously. It is to be understood that it is within the purview of the invention to provide a similar skid control modulator for the front wheel brakes or to provide independent control for each wheel cylinder 15, 16, 17 and 18. Such modifications are deemed to be within the scope of those skilled in the art and for that reason will not be described.

Wheel speed sensors 22 and 23 are associated with each of the rear wheels and provide electric signals via conduits 24 and 25 to an electrical module 26. In the event of an incipient skid condition, which may be sensed in any of a variety of known manners, the module 26 provides a signal to the modulator 19 via a conductor indicated schematically at 27.

Referring now specifically to the modulator 19, the master cylinder conduit 14 delivers fluid to a chamber 28 in which a combined check and bleed valve, indicated generally by the reference numeral 29, is positioned. The check and bleed valve 29 is of the construction described in U.S. Pat. No. 3,486,800, entitled "Skid Control System Including Hydraulic Modulating Valve," issued Dec. 30, 1969 in the name of David T. Ayers, Jr. Reference may be had to that patent for a description of the complete structure and operation of the valve 29. Basically, the valve 29 includes a first plunger 31 that directly actuates a valve 32 for controlling the flow from the chamber 28 into a conduit 33. A second plunger 34 is slidably supported by the first plunger 31 and has a head 35 that is movable into engagement with a portion 36 for controlling the flow through a restricted path from the chamber 28 into the conduit 33. The plunger 34 is longer than the plunger 31 so that on reapplication of the brakes, as will become more apparent, initial flow from the master cylinder 12 to the wheel cylinders 17 and 18 will take place through this restricted path.

At the mouth of the conduit 33 an enlarged diameter chamber 36 is provided. The chamber 36 has slidably supported within it an expansion chamber plunger 37. In the normal braking position, as shown in the FIGURE, the plunger 37 is held at a minimum volume condition and engages the plungers 31 and 34 to hold the combination check and bleed valve in a fully open condition against the bias of valve springs 38 and 39.

At the base of the chamber 36 a further, larger diameter chamber 41 is provided. Within the chamber 41 is slidably supported a power piston 42. Power piston 42 is formed with a concentric bore 43. Slidable within the bore 43 is a cylindrical extension 44 of the expansion chamber plunger 37. Facing shoulders 45 and 46 of the expansion chamber plunger 37 and power piston 42 are normally held in abutment. A coil compression spring 47 encircles an extension 48 of the power piston 42 and normally urges the piston 42 toward the left as viewed in the FIGURE.

A source of ancillary fluid pressure is provided for maintaining the power piston 42, expansion chamber plunger 37 and check and bleed valve 29 in the normal braking position, as shown in the FIGURE in opposition to the action of the springs 47, 38 and 39. The term ancillary fluid refers to a fluid pressure source other than the brake pressure. In the illustrated embodiment, this ancillary fluid pressure source is provided by an engine driven pump 49 which may be the vehicle power steering pump. The pump 49 draws fluid from a sump 51 through a conduit 52 and discharges it under pressure into a conduit 53. The pressure in the conduit 53 is controlled by a regulator, indicated generally by the reference numeral 54, in a manner which will become more apparent as this description proceeds.

The conduit 53 serves the power steering gear of the vehicle, indicated schematically at 55, via the regulator 54 and a conduit 56. A conduit 57 returns the fluid from the power steering gear 55 to the sump 51.

A valve, indicated generally by the reference numeral 58 controls the flow of the ancillary fluid from the conduit 53 to the power piston chamber 41. The valve 58 is fed via a conduit 59 which terminates at a valve seat 61. Juxtaposed to the valve seat 61 is a valve plate 62 that is normally biased by a spring 63 to an opened position. In this position, the power steering fluid may flow from the conduit 59 into a valve chamber 64. The valve chamber is ported, as at 65, to the chamber 41.

A solenoid winding 66 is positioned in the valve housing and, when actuated, draws the valve plate 62 downwardly into a closed relationship with the valve seat 61. Simultaneously, a valve seat 67 that is directly opposite to the valve seat 61 is opened. The power steering fluid may then be displaced, in a manner to be described, from the chamber 41, port 65 and chamber 64 back to the sump 51 via a return conduit 68.

The regulator 54 includes a plunger 71 having a portion that is slidably supported in a bore 72. The plunger 71 has a projection 73 that cooperates with a counterbore 74 that terminates in the conduit 56 so as to regulate the pressure drop and, accordingly, the pressure in the conduit 53.

A coil spring 76 encircles an extension 77 of the plunger 71 to provide a preselected bias on the plunger 71. In addition, a second plunger 78 has a bore 79 that receives a projection 81 of the plunger portion 77. The second plunger 78 is supported in a bore 82 that experiences the pressure in the braking circuit and particularly that in the conduit 14 through a conduit 83. As the brake pressure from the master cylinder to the rear wheel brakes is increased, the plunger 78 will bias the plunger 71 to a direction that increases the pressure in the conduit 53.

As is common with many forms of skid control systems, actuation of the skid control modulator 19 causes the check and bleed valve 29 to close and isolate the rear wheel brake cylinders 17 and 18 from the master cylinder supply conduit 14. At the same time, the expansion chamber plunger 37 is permitted to regress against the bias of the power piston 42 to relieve the pressure in the rear wheel brake cylinders 17 and 18.

The source of ancillary fluid, the power steering pump 49, is utilized to hold the check and bleed valve 29 open and to hold the expansion chamber plunger 37 in its minimum volume condition. In the event of failure of the power steering pump 49 or bursting of any of the conduit, 53, 59 or 56, a fail safe device, indicated generally by the reference numeral 84, is provided for delivering the brake fluid directly from the master cylinder conduit 14 to the rear wheel brake cylinders 17 and 18 independently of the chamber 36. This will prevent the loss of actuating fluid and will permit normal brake operation albeit without the skid control function.

The fail safe device 84 includes an isolation valve 85 that is carried by a plunger 86. The plunger 86 has a bypass valve end portion 87 that controls the flow through a port 88 formed at the end of a conduit 89. The conduit 89 extends from the chamber 28 to a chamber 91 in which the isolation valve 85 is located. A coil spring 92 encircles the plunger 86 and normally biases the isolation valve 85 toward a closed position, with a port which will be described, and the bypass valve portion 87 to an open position.

The plunger 86 extends through a transverse passage 93 that interconnects the chamber 91 with a conduit 94 that extends to the expansion chamber 36. The isolation valve 85 normally controls the flow through the conduit 94 and passage 93. When this passage is open, brake fluid can flow from the master cylinder past the check and bleed valve 29 through the expansion chamber 36 and on to the chamber 91 via conduit 94 and passage 93. The brake fluid is then delivered to the conduit 21 via a conduit 95.

The isolation valve 85 is normally held in its opened position by means including a plunger 96 that is slidably supported in a stepped bore 97 and which has an end portion 98 that engages the plunger 86. The plunger 96 has its opposite end bored as at 99 to receive a cylindrical extension 101 of a fail safe piston 102. The piston 102 is slidably supported in a bore 103 that experiences the pressure in the conduit 53 via a conduit 104. A coil spring 105 encircles the plunger 96 and bears against a shoulder 106 to act in opposition to the pressure in the bore 103.

The plunger 96 is formed with an annular relief 107 that terminates at one end in an inclined ramp portion 108. The actuating plunger 109 of a switch 111 is received within the relief 107 an is adapted to be actuated by the inclined surface 108, as will become apparent.

OPERATION

As has been noted, the FIGURE illustrates the system as it appears when in condition for normal brake operation. The power steering pump 49 is generating pressure in the conduit 53 at an amount determined by the position of the regulator 54 which is determined in this condition by the preload on the spring 76. At least the predetermined pressure will be maintained regardless of the demands of the power steering gear 55. This pressure is transmitted through the conduit 59 and normally open valve 58 to the chamber 41 to hold the power piston 42 in a position so as to maintain a minimum volume in the chamber 36 and to hold the check and bleed valve 29 in its open position. Simultaneously, the pump pressure is transmitted through the conduit 104 to act on the fail safe piston 102 and hold the isolation valve 85 in its opened position and the bypass end portion 87 in its closed position.

Upon actuation of the master cylinder 12, pressure will be exerted through the circuit 13 to the front wheel brake cylinders 15 and 16. Pressure will be transmitted through the conduit 14 to the chamber 28. This fluid flows past the open check valve 32, through the passage 33 into the expansion chamber 36. The pressure acting on the power piston 42 holds the expansion chamber plunger 37 in the illustrated position and brake fluid passes from the chamber 36 into the conduit 94. From the conduit 94 brake fluid flows through passage 93 to chamber 91 past the open isolation valve 85. Fluid leaves the chamber 91, passes to conduit 95 and thence to conduit 21 to actuate the rear wheel cylinders 17 and 18.

The master cylinder pressure is also transmitted from the chamber 28 through the conduit 83 on to the smaller plunger 78 of the regulator 54. This will create a bias on the plunger 71 to the left to restrict the flow through the counterbore 74 and raise pressure in the conduit 53 in proportion to the master cylinder pressure exerted on the conduit 14. Hence, further pressure will be exerted on the power piston 42 to resist movement of the expansion chamber plunger 37 and to resist closure of the check and bleed valve 29. Because of this regulation in proportion to master cylinder pressure, it is possible to actuate the system at a lower net pressure. Said another way, if the regulator 54 was not responsive to the pressure in the brake conduit 14, the power piston 42 and pressure in the conduit 53 would have to be set sufficiently to overcome the maximum anticipated pressure in the conduit 14. As a result, it would not be possible to obtain as smoothly a modulated operation.

It should be noted that the ratio of the area of the plunger 71 exposed to the pressure in the chamber 72 to the area of the plunger 78 exposed to the pressure in the chamber 82 is less than the corresponding ratio of the area of the power piston 42 exposed to the pressure in the chamber 41 to the area of the expansion chamber plunger 37 exposed to the pressure in the expansion chamber 36. Thus, as the pressure increases in the brake conduit 14, the regulator 54 will maintain an increased pressure on the power piston 42 and the expansion chamber plunger 37 somewhat in excess of the pressure needed to maintain check and bleed valve 29 in the opened position.

In the event an incipient skid condition is sensed by the electric module 26, a signal will be sent via the conductor 27 to the valve 58. The solenoid winding 66 will be energized to draw the valve plate 62 downwardly against the bias of the spring 63. The valve seat 61 will then be closed to isolate the power piston chamber 41 from the pump supply conduit 53. Simultaneously, the pressure in the chamber 41 will be dumped to the sump 51 via the open valve seat 67 and conduit 68. The spring 47 and brake pressure on plunger 37 will then urge the power piston 42 to the left. The springs 38 will, at this time, close the combined check and bleed valve 29 cutting off the communication between the master cylinder conduit 14 and the wheel cylinder conduit 21. The pressure acting in the expansion chamber 36 will, at this time, be sufficient to cause the expansion chamber plunger 37 to move to the left and increase the volume in the expansion chamber 36. This increase in volume relieves the pressure on the wheel cylinders 17 and 18 and, in effect, will release the brakes. It should be noted that at this time the expansion chamber plunger 37 will have moved away from the plungers 33 and 34 of the check and bleed valve 29.

At a predetermined condition, the electric module 26 will send a signal to cause reapplication of the brakes. In the illustrated embodiment this is done by dicontinuing the electric current flow to the solenoid winding 66. The valve plate 62 is then urged upwardly by the spring 63 to close the valve seat 67 and open the valve seat 61. Power steering pump pressure will then be reapplied to the power piston 42 which, in turn, urges the expansion chamber plunger 37 to the right to decrease the volume in the expansion chamber 36. At this time, the combined check and bleed valve 29 will still be closed. Thus, the wheel cylinders 17 and 18 are gradually reapplied first by the action of the expansion chamber plunger 37. It should be noted that, unless the operator has removed his foot from the brake pedal, wheel master cylinder pressure will still be experienced in the conduit 14 and chamber 28.

After the expansion chamber plunger 37 has moved sufficiently it will engage the bleed valve plunger 34 to open it from its engagement with the seat 36. Master cylinder pressure will, then, be similarly reapplied through the small clearance volume. Upon continued movement, the plunger 31 will be engaged to open the check valve 32 and permit free communication between the conduit 14 and the wheel cylinders 17 and 18.

It will be noted that pressure of the power steering pump 49 is required to hold the check and bleed valve 29 and expansion chamber plunger 37 in their normal braking positions. In the event of failure of the pump 49 or rupturing of any of the conduits 53, 56, 59, 104 or other fluid leakages, there will be insufficient pressure to resist the brake pressure that tends to cause the check and bleed valve 29 and expansion chamber plunger 37 to move to their skid control positions. However, under this circumstance there will be insufficient pressure acting on the fail safe piston 102 to resist the action of the springs 105 and 92. Thus, the plungers 96 and 86 will shuttle to the left. This movement will first cause opening of the communication of the conduit 89 with the chamber 91 through opening of the bypass valve portion 87 and subsequently closing of the isolation valve 85. Thus, a bypass conduit is open to permit brake pressure to be exerted from the master cylinder to the wheel cylinders 17 and 18. The brake pressure flows from the conduit 14 and chamber 28 into the conduit 89. This fluid can then flow through the conduit 95 and conduit 21 to brake cylinders 17 and 18 to effect actuation. This is accomplished without significant loss of actuating fluid. Some small amount of fluid will be lost, however, due to the movement of the check and bleed valve 29 to its closed position. This amount of fluid is relatively insignificant.

At this time the plunger 96 shuttles to the left, the switch 111 will be actuated to provide a visual warning via a suitable circuit and indicator either a light or buzzer (not shown) to the vehicle operator. He will then be warned that his skid control system is not operating properly. Upon re-establishment of satisfactory pressure from the pump 49, the fail safe valve 84 will be automatically returned to the position shown in the FIGURE.

In vehicular operation the skid control modulator 19 may not be called upon to function for long periods of time. That is, an incipient skid condition may not occur for a considerable time period. It is, therefore, desirable to periodically cycle certain of the elements to insure that they will not stick or otherwise bind in their normal position. The construction of certain elements of the modulator 19 is such that this automatic cycling will occur each time the vehicle engine is started and stopped. As has been noted, the pump 49 is driven by the vehicle engine. Thus, each time the engine stops the pump 49 will not exert pressure in the conduits 53, 59 and 104. Accordingly, the spring 76 will move the regulator plunger 79 to an extreme left-hand position each time the engine stops. In a like manner, the spring 47 will urge the power piston 42 to an extreme left-hand position. The spring 105 will cause a similar action on the plunger 96 and piston 102. The spring 92 will also move the fail safe valve 84 to its closed position and the associated plunger to its opened position. Upon restarting of the vehicle engine, each one of the aforenoted elements will be moved back to the normal braking positions.

The ratio of the area of the fail safe plunger 102 exposed to the pressure in the chamber 103 to the portion exposed to the pressure at the termination of the conduit 94 is less than the corresponding ratio of area of the power piston 42 and expansion chamber plunger 37. Thus, in the event of pressure failure the fail safe device will shuttle before the expansion chamber plunger. The aforementioned ratio of area of the fail safe device is greater than the corresponding area ratio of the regulator 54.

It is to be understood that the foregoing description is that of a preferred embodiment of the invention. In the preferred embodiment, the modulator 19 included the pressure regulator 54. In certain instances, such as where the skid control system is integrated with a hydraulically assisted brake system, the regulator may be eliminated. In such an embodiment, pressure in conduit 53 would be generated directly by the hydraulic booster of the brake system. Various other changes and modifications may be made without departing from the spirit and scope of the invention as defined by the appended claims.

I claim:

1. A skid control system for a vehicle comprising a master cylinder for providing a source of actuating fluid pressure, a wheel cylinder for operating one wheel brake of the vehicle, a brake actuating circuit interconnecting said master cylinder and said one wheel cylinder, modulator means in said brake actuating circuit between said master cylinder and said wheel cylinder for reducing the pressure transmitted from said master cylinder to said wheel cylinder in response to a predetermined signal for preventing a skid condition, a bypass circuit interconnecting said master cylinder and said one wheel cylinder, a first valve element for controlling the flow of fluid from said modulator to said wheel cylinder, a second valve element for controlling the flow through said bypass circuit from said master cylinder to said one wheel cylinder, each of said valve elements being movable between an opened position and a closed position, and a common actuating means directly affixed to each of said valve elements for moving said first valve element from its opened position to its closed position simultaneously with movement of said second valve element from its closed position toward its open position.

2. A skid control system as set forth in claim 1 wherein the first valve element comprises an annular valve member affixed to said actuating means at a point spaced from its one end and a second valve element comprises a valve head formed at one end of the actuating means.

3. A skid control system as set forth in claim 1 further including spring means for biasing said first valve element to a closed position and said second valve element to an opened position.

4. A skid control system as set forth in claim 3 further including power means for holding said modulator means in a normal braking position to prevent the reduction of pressure transmitted from the master cylinder to the wheel cylinder and for holding the first and second valve elements in a position opposing the spring means.

5. A skid control system as set forth in claim 4 wherein the power means comprises a pump driven by the engine of the associated vehicle.

* * * * *